United States Patent Office 3,141,856
Patented July 21, 1964

3,141,856
LINEAR CONDENSATION POLYMERS OF BIS-
(PHOSPHINE) DECABORANES
Joseph R. Reiner, Northford, and Hansjuergen A.
Schroeder, New Haven, Conn., assignors to Olin
Mathieson Chemical Corporation, a corporation of
Virginia
No Drawing. Filed June 28, 1962, Ser. No. 205,862
8 Claims. (Cl. 260—2)

This invention relates to the preparation of linear polymers by the condensation of bis(halodiarylphosphine) decaboranes with bis(hydroxydiarylphosphine) decaboranes. More particularly, it relates to linear polymers formed by the condensation of approximately equal molar amounts of bis(chlorodiarylphosphine) decaboranes and bis(hydroxydiarylphosphine) decaboranes.

Although the structural formula of the linear polymers of this invention has not been definitely established one possible mechanism for the preparation of these novel polymeric materials can be illustrated by the following equation.

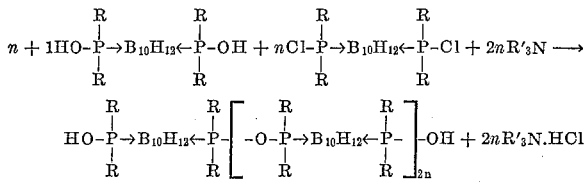

In the above equation $n$ is about 5 to 100 or more and R is an aryl radical selected from the group consisting of phenyl, tolyl, xylyl, naphthyl and biphenylyl and R' is an alkyl radical having from 1 to 5 carbon atoms in the alkyl group. The novel polymers of this invention can be prepared by the condensation of bis(hydroxydiarylphosphine) decaboranes with a bis(chlorodiarylphosphine) decaborane in approximately equal molar proportions at temperatures ranging from about 60° to 220° C. in the presence of a tri(lower alkyl)amine. The reaction can be carried out, for example, by adding a solution of dry tri(lower alkyl) amine in an inert organic solvent to a suspension of bis(chlorodiarylphosphine) decaborane and bis(hydroxydiarylphosphine) decaborane in an inert organic solvent and heating the resulting reaction mixture to a temperature of from 60° C. to 220° C. Alternatively, the amine solution can be added to a refluxing suspension of the two reactants in an inert organic solvent. The polymerization reaction is carried out while the reactants are in admixture with an inert organic solvent. The reaction time generally will be from about 0.5 to 5 hours or more depending upon the particular solvent and other reaction conditions employed.

Suitable solvents for use in the preparation of novel polymers of this invention include benzene, toluene, xylene decaline, dioxane, carbon tetrachloride, etc. The proportion of solvent employed is not critical and may range from about 1 to about 10 parts or more by weight per part of the reactants used. Tri(lower alkyl) amines useful in this invention include trimethyl amine, triethyl amine, methyl diethyl amine, tri-isopropyl amine, tributyl amine and triisoamyl amine, etc. The presence of the tri(lower alkyl) amine is essential in the process of this invention. Without the addition of a tri(lower alkyl) amine, the compounds bis(chlorodiphenylphosphine) decaborane and bis(hydroxydiphenylphosphine) decaborane do not react to form polymers even under refluxing conditions and from such a reaction the starting materials are recovered unchanged. In addition, the amine serves to bind the hydrogen chloride set free during the polymerization thus causing the reaction to proceed to completion. Generally the molar amount of the amine employed will be equal to two times the number of moles of the bis-(chlorodiphenylphosphine) decaborane charged to the reactor although an excess of the amine up to about 3 or 4 moles or more of amine per mole of the bis(chlorodiphenylphosphine) decaborane can be employed, if desired. The bis(chlorodiarylphosphine) decaboranes utilized as starting materials in the process of this invention can be prepared by the process set forth in Heying and Schroeder application Serial No. 205,859, for Product and Method, filed June 28, 1962. The compound bis(chlorodiphenylphosphine) decaborane is prepared, for example, by reacting a solution of diphenylchlorophosphine in ether with a solution of decaborane in ether for about 2 hours at 25° C. and recovering the resulting product from the reaction mixture.

Other useful bis(chlorodiarylphosphine) decaboranes include, bis(chlorodiphenylphosphine) decaborane, bis-(chlorodinaphthylphosphine) decaborane, bis(chloroditolylphosphine) decaborane, bis(chlorodixylylphosphine) decaborane, bis(chlorodiethylphenylphosphine) decaborane, bis(chlorodimethylnaphthylphosphine) decaborane, etc.

Bis(hydroxydiarylphosphine) decaboranes useful as starting materials in the preparation of the novel polymers of this invention include, for example, bis(hydroxydiphenylphosphine) decaborane, bis(hydroxyditolylphosphine) decaborane, bis(hydroxydixylylphosphine) decaborane, bis(hydroxydiisopropylphenylphosphine) decaborane, and bis(hydroxydi-n-butyltolylphosphine) decaborane. Bis(hydroxydiarylphosphine) decaboranes can be prepared in the manner described and claimed in Schroeder application Serial No. 205,860, for Process, filed June 28, 1952. According to the method described in this application bis(hydroxydiphenylphosphine) decaborane can be prepared by reacting bis(chlorodiphenylphosphine) dissolved in acetone with a stoichiometric excess of water.

The polymeric product, which precipitates from the inert organic solvent utilized in the reaction, can be separated from the reaction mixture by a wide variety of methods well known to the arts such as by filtration, decantation, etc.

The polymers of this invention are insoluble in most common organic solvents such as acetone, ligroin, alcohols, chloroform, and xylene. Molecular weight determinations made by light scattering methods in N-methylpyrrolidone solution gave values as high as about 27,000. Polymers produced by the process of this invention do not melt upon heating but start to evolve hydrogen at about 270° C. and when heated up to 400° C. a product remains which is insoluble in any of the solvents investigated which included dimethylformamide, nitromethane, dimethylsulfioxide, and N-methylpyrrolidone. Films which are useful as protective coatings for metal objects in high temperature service can be formed from the polymeric products of this invention. A solution of the polymer in a suitable solvent, such as methyl pyrrolidone can be applied to the object by dipping or brushing and a protective film formed by evaporation of the solvent. These valuable polymers are useful for the preparation of a wide variety of products because of their excellent heat resistance and extreme resistance to solvent action. For example, such polymers can be incorporated into phenol-formaldehyde or urea-formaldehyde plastics to increase the high temperature stability and solvent resistance of such products.

This invention is illustrated in detail by the following examples.

EXAMPLE I

Bis(chlorodiphenylphosphine) decaborane (5.0 g., .009 mole) and bis(hydroxydiphenylphosphine) decaborane (4.7 g., .009 mole) were mixed in a dry flask. A solution of 1.818 g., (.018 mole) dry triethylamine in 50 ml. dry benzene was added very slowly with stirring. After the addition, which required about 45 minutes, the mixture was refluxed for an hour and then filtered. The residue was washed first with cold acetone, then water and finally with hot acetone. A white polymeric product (M.P. >300° C.) remained (7.85 g., 87 percent of the theoretical quantity).

Calc'd for $C_{24}H_{32}B_{10}OP_2$: C, 56.89; H, 6.37; B, 21.36; P, 12.23. Found: C, 56.6; H, 6.7; B, 20.8; P, 11.7.

EXAMPLES II–VI

A number of adidtional experiments were performed in the same manner as described in Example I. Pertinent data relating to these experiments is included in Table I which follows.

*Table 1*

| Example | Reactor Charge | | | Addition Period (Minutes) | Reflux Period (Minutes) | Yield of Polymer | |
|---|---|---|---|---|---|---|---|
| | Bis(Chlorodi-phenylphos-phine) Deca-borane (Mole) | Bis(Hydroxy-diphenylphos-phine) Deca-borane (Mole) | Triethyl Amine (Mole) | | | (Grams) | (Percent) |
| II | 0.0036 | 0.0036 | ¹ 0.0072 | 10 | 60 | 1.67 | 46 |
| III | 0.0036 | 0.0036 | ¹ 0.0072 | 10 | 120 | 1.75 | 48 |
| IV | 0.0036 | 0.0036 | ¹ 0.0072 | 20 | 90 | 1.86 | 51 |
| V | 0.0036 | 0.0036 | ¹ 0.0072 | 30 | 120 | 2.58 | 71 |
| VI | 0.0036 | 0.0036 | ¹ 0.0072 | 45 | 60 | 3.13 | 86 |

¹ Dissolved in 30 ml. of dry benzene.

EXAMPLE VII

A solution of 2.1 g. (0.02 mole) of triethylamine (dried over KOH) in anhydrous benzene (50 ml.) was added, with stirring, to a suspension of bis(chlorodiphenylphosphine) decaborane (5.6 g., 0.01 mole) and bis(hydroxydiphenylphosphine) decaborane (5.2 g., 0.01 mole) in anhydrous benzene (40 ml.) over a period of 15 minutes. After the addition had been completed, the mixture was refluxed for one hour and then filtered. The residue was extracted with water and hot acetone to remove soluble by-products yielding 8.3 g. (82 percent of the theoretical amount) of the polymeric product (M.P >300° C.):

Calc'd for $C_{24}H_{32}B_{10}OP_2$: C, 56.89; H, 6.37; B, 21.36; P, 12.23. Found: C, 56.64; H, 6.65; B, 20.80; P, 11.90.

EXAMPLES VIII–IX

Examples VIII and IX which were carried out in the same manner as described in Example VII are reported in Table 2 which follows.

*Table 2*

| Example | Reactor Charge | | | Addition Period (Minutes) | Reflux Period (Minutes) | Yield of Polymer | |
|---|---|---|---|---|---|---|---|
| | Bis(Chlorodi-phenylphos-phine) Deca-borane (Mole) | Bis(Hydroxy-diphenylphos-phine) Deca-borane (Mole) | Triethyl Amine (Mole) | | | (Grams) | (Percent) |
| VIII | 0.01 | 0.01 | ¹ 0.02 | 45 | 60 | 8.4 | 83 |
| IX | 0.005 | 0.005 | ² 0.01 | 30 | 60 | 4.3 | 85 |

¹ Dissolved in 50 ml. of dry benzene.
² Dissolved in 25 ml. of dry benzene.

EXAMPLE X

A solution of 1 g. (0.01 mole) of dry triethylamine in anhydrous benzene (30 ml.) was added, with stirring, to a suspension of bis(chlorodiphenylphosphine) decaborane (2.8 g., 0.005 mole) and bis(hydroxydiphenylphosphine) decaborane (2.6 g., 0.005 mole) in anhydrous benzene (40 ml.). During the addition period (20 minutes) the mixture was refluxed (bath temperature 95° C.), and was then kept refluxing for another hour. The reaction product was worked up as described in Example VII to yield 3.7 g. (73 percent of the theoretical amount) of polymeric product. The product was shown by its IR spectrum to be the same type of polymer as produced in Example I.

EXAMPLE XI

Dry triethylamine (2.02 g., 0.02 mole) dissolved in anhydrous dioxane (50 ml.) was added, with stirring, to a suspension of bis(chlorodiphenylphosphine) decaborane (5.61 g., 0.01 mole) and bis(hydroxydiphenylphosphine) decaborane (5.23 g., 0.01 mole) in anhydrous 1,4-dioxane (100 ml.) over a period of 20 minutes. Then the mixture was refluxed for one hour and filtered. The residue was washed thoroughly with acetone, water, and finally with hot acetone. A white polymer remained (M.P. >300°); yield: 7.9 g. (78 percent of the theoretical quantity). The product was identified by its IR spectrum which was identical with that of the product of Example I.

EXAMPLE XII (A) An 8.4 percent solution in N-methylpyrrolidone of the polymeric product prepared by reacting substantially equimolar proportions of bis(chlorodiphenylphosphine) decaborane and bis(hydroxydiphenylphosphine) decaborane in the presence of triethylamine, was applied to an anodized aluminum plate and evaporated at 300° F. A clear, continuous, adhesive film was formed which was resistant to impact and bending.

(B) A paste consisting of 66 percent by weight of a phenolformaldehyde resin of phenol-novolak type (in alcoholic solution), 33 percent by weight of the polymeric product prepared as described in Part A of this example and 1 percent of hexamethylenetetramine (as a curing agent) was brushed on and between anodized aluminum plates and the solvents were then evaporated by heating thus prepared plates at 120° C. for 30 minutes. On the aluminum plates a continuous and adhesive film was formed demonstrating the incorporation of the boron-containing polymer into the phenolic resin. Furthermore, the addition of the boron-containing polymer enhanced the adhesive properties of the phenolic resin in the metal to metal bond.

What is claimed is:

1. The linear polymeric condensation products of the condensation of substantially equimolar proportions of a compound of the formula:

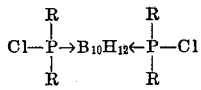

wherein R is an aryl radical selected from the group consisting of phenyl, tolyl, xylyl, naphthyl and biphenylyl, with a material of the formula:

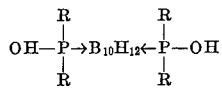

wherein R has the same meaning as previously defined.

2. The product of claim 1 in which the said compound is bis(chlorodiphenylphosphine) decaborane and the said material is bis(hydroxydiphenylphosphine) decaborane.

3. A process for the preparation of linear polymeric condensation products which comprises reacting a compound of the formula:

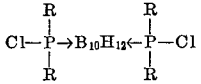

wherein R is an aryl radical selected from the group consisting of phenyl, tolyl, xylyl, naphthyl and biphenyl with an approximately equal molar amount of a material of the formula:

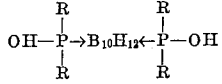

wherein R has the same meaning as previously defined, in the presence of a tri(lower alkyl) amine and at a temperature of from about 60° C. to about 200° C., while the reactants are in admixture with an inert organic solvent.

4. The process of claim 3 wherein the said compound is bis(chlorodiphenylphosphine) decaborane.

5. The process of claim 2 wherein the said material is bis(hydroxydiphenylphosphine) decaborane.

6. The process of claim 2 wherein the said tri(lower alkyl) amine is triethyl amine.

7. The process of claim 3 wherein the said inert organic solvent is benzene.

8. The process for the preparation of a linear polymeric condensation product which comprises reacting bis(chlorodiphenylphosphine) decaborane with an approximately equal molar quantity of bis(hydroxydiphenylphosphine) decaborane in the presence of triethyl amine and at a temperature of from about 60° C. to about 200° C. while the reactants are in admixture with an inert organic solvent.

References Cited in the file of this patent
UNITED STATES PATENTS
3,071,552    Burg _____ Jan. 1, 1963